United States Patent [19]

Van Zon et al.

[11] Patent Number: 5,242,609
[45] Date of Patent: Sep. 7, 1993

[54] LUBRICANT COMPOSITION COMPRISING MINERAL OIL FUNCTIONALIZED WITH A AROMATIC SUBSTITUTED MONOSULFONYL AZIDE

[75] Inventors: Arie Van Zon; Everardus J. A. Van Jole, both of Amsterdam, Netherlands; Paul G. Gadd, Rio de Janeiro, Brazil

[73] Assignee: Shell Oil Company, Houston, Tex.

[21] Appl. No.: 632,269

[22] Filed: Dec. 21, 1990

[30] Foreign Application Priority Data

Dec. 21, 1989 [GB] United Kingdom ............. 8928963.1

[51] Int. Cl.$^5$ ............... C10M 105/72; C10M 159/12; C10M 135/08
[52] U.S. Cl. .................................. 252/33.6; 252/47.5
[58] Field of Search ............................ 252/47.5, 33.6

[56] References Cited

U.S. PATENT DOCUMENTS

| | | | |
|---|---|---|---|
| 3,220,985 | 11/1965 | Breslow | 260/79.3 |
| 4,031,068 | 6/1977 | Cantor | 260/79.3 R |
| 4,440,659 | 4/1984 | Chen et al. | 252/51.5 |
| 4,970,009 | 11/1990 | Van Zon et al. | 252/47.5 |

FOREIGN PATENT DOCUMENTS 0368395 5/1990 European Pat. Off. .
1446062 8/1976 United Kingdom .

OTHER PUBLICATIONS

Research Disclosure 13449, Jun. 1975.

Primary Examiner—Jerry Johnson

[57] ABSTRACT

The invention provides lubricating oil compositions containing a base oil functionalized by the presence of aromatic groups attached to molecules of the base oil by a sulfonamido linkage, and their preparation by a process which consists of reacting the base oil with an aromatic sulfonyl azide.

13 Claims, No Drawings

LUBRICANT COMPOSITION COMPRISING MINERAL OIL FUNCTIONALIZED WITH A AROMATIC SUBSTITUTED MONOSULFONYL AZIDE

FIELD OF THE INVENTION

The present invention relates to lubricating oil compositions and to their preparation.

BACKGROUND OF THE INVENTION

Continuing development of internal combustion engines and the desire for increased intervals between oil changes places ever increasing demands on lubricating oils. Two properties in particular for which improved performance is desired are dispersancy and oxidation resistance. Typically the approach to improving such properties involves developing specific performance additives which are blended with an appropriate base oil.

Research Disclosure 13449 of June 1975 discloses the use of aromatic sulfonyl azides containing a carboxylic acid (or anhydride) group in the preparation of functionally substituted EPM and EPDM polymers. The sulfonyl azides are said to decompose thermally to give sulfonyl nitrenes which become grafted to the EPDM polymers by addition across carbon-carbon double bonds (giving aziridines) and insertion into C-H bonds. Thermoplastic ionomers with attractive physical properties are obtained by compounding the engrafted EPDM polymers with metal salts.

U.S. Pat. No. 3,220,985 (filed Oct. 15, 1962) discloses modification of polymers including Cis-1,4-polyisoprene, polybutadiene and styrene-butadiene rubber, particularly polypropylene and polyisobutylene, by heating with a monosulfonyl azide having the formula $RSO_2N_3$ wherein R represents an organic radical (e.g. 3-azidosulfonylbenzoic acid), in order to prepare products having improved dyeability, emulsifiability and adhesion to other materials. UK Patent 1,446,062 discloses modification of similar polymers with mixed anhydrides of sulfonylazides with at least one carboxyl group.

U.S. Pat. No. 4,440,659 (filed Feb. 19, 1982) discloses the preparation of ashless dispersants suitable for adding to lubricating oil by co-grafting maleic anhydride and an alkyl acrylate or methacrylate onto a Bright Stock mineral oil backbone followed by reaction with an amine to form amides and/or imides.

It has now surprisingly been found possible to modify directly a base oil by molecular attachment of certain aromatic groups via a sulfonamido linkage and thereby achieve enhanced dispersancy.

SUMMARY OF THE INVENTION

According to the present invention therefore there are provided lubricating oil compositions comprising a base oil functionalized by the presence of aromatic groups attached to molecules of the base oil by a sulfonamido linkage.

DESCRIPTION OF THE INVENTION

The aromatic groups and associated sulfonamido linkages suitably together have the structure $RSO_2NH—$, where R is an aromatic group, which may be an optionally substituted naphthyl group but is preferably an optionally substituted phenyl group. The group R preferably contains at least one hydroxyl group or a salt thereof and/or carboxyl group or a salt, ester or amide derivative thereof. Possible additional substituents include halogen atoms, i.e. fluorine, chlorine, bromine or iodine atoms, cyano groups, dialkylamino groups, e.g. di($C_{1-4}$alkylamino) groups, nitro groups, alkyl groups, e.g. $C_{1-6}$ alkyl groups, and cycloalkyl groups, e.g. $C_{3-8}$ cycloalkyl groups.

R preferably represents a phenyl group bearing a substituent —COX, wherein X is a moiety selected from —OH, and alkali metal, e.g. sodium or potassium, alkaline earth metal, e.g. calcium, and ammonium salts thereof, groups $OR^1$, where $R^1$ is an optionally substituted alkyl group, and groups —$NHR^2$, wherein $R^2$ is an optionally substituted alkyl group. The substituent —COX may conveniently be attached at the 3-position of the phenyl group.

The group $R^1$ may be an unsubstituted alkyl group, preferably a $C_{6-18}$ alkyl group, e.g. a $C_{10-14}$ alkyl group, such as a dodecyl group, or it may be a substituted alkyl group such as a polyalkylene glycol-derived moiety.

The groups —$NHR^2$ are preferably derived from $C_{1-18}$ amines containing 1 to 8 nitrogen atoms. Such $C_{1-18}$ amines may be branched or unbranched, saturated aliphatic primary or secondary amines, containing 1 to 8 nitrogens, preferably mono- or diamines, such as ethylamine, butylamine, sec. butylamine, diethylamine and 3-dimethylamino-1-propylamine, but including higher polyamines such as alkylene polyamines, wherein pairs of nitrogen atoms are joined by alkylene groups of 2 to 4 carbon atoms. Thus, polyamines of the formula:

$$NH_2(CH_2)_n—[NH(CH_2)_n]_m—NH_2$$

are includes where n is 2 to 4 and m is 0 to 6. Examples of such polyamines include tetraethylene pentamine, tripropylene tetramine, triethylene tetramine, diethylene triamine, n-aminoalkyl piperazines. e.g., N-(2-aminoethyl) piperazine, N,N'-di(2-aminoethyl) piperazine, and corresponding commercial mixtures such as "Polyamine H", and "Polyamine 500".

In particularly preferred compositions of the invention R represents a phenyl group bearing a substituent —$CONHR^2$ wherein the group —$NHR^2$ is derived from 3-dimethylamino-1-propylamine.

The base oil may be a base oil of mineral or synthetic origin. Base oils of synthetic origin may typically be mixtures of $C_{10-50}$ hydrocarbon polymers e.g. liquid polymers of alpha-olefins. Preferably the base oil is of mineral origin, such as those sold by the Royal Dutch/Shell Group of companies under the designations "HVI" or, most preferably, "XHVI" (trademark). The treated lube oil may be in admixture with an untreated base oil and the treated oil having sulfonamido linkages may be either a major or minor portion of the mixture wherein major is greater than 50% wt and minor is less than 50% wt.

The invention also provides a process for preparing a lubricating oil composition according to the invention which comprises reacting the base oil with an aromatic sulfonyl azide. This reaction may be followed by a further treatment to modify substituents on the aromatic moiety.

A preferred process of the invention comprises heating the base oil with an aromatic sulfonyl azide of formula $R'—SO_2—N_3$ wherein $R'$ is a phenyl group bearing a substituent —COOH, at a temperature in the range 100° to 300° C., preferably 150° to 250° C., optionally followed by neutralizing the resulting composition with an alkali metal or alkaline earth metal base, ammonia or an amine, or by further reacting the resulting composition, optionally after conversion of —COOH groups to —COCl groups, with an alcohol of formula HOR$^1$, where R$^1$ is as defined above or is an optionally substituted alkyl group, preferably a C$_{1-18}$ amine containing 1 to 8 nitrogen atoms, advantageously 3-dimethylamine-1-propylamine.

The reaction of the base oil with the aromatic sulfonyl azide may if desired be effected in the presence of an anti-oxidant, e.g. a sterically hindered phenol such as "Ionox 220", trademark for 4,4'-methylene-bis-2,6-ditertiary butylphenol or "Ionox 330", a trademark for 1,3,5-trimethyl-2,4,6-tris(3,5-di-tert-butyl-4-hydroxybenzyl)benzene.

It is greatly preferred for the above reactions to be effected in the absence of oxygen, e.g. under nitrogen.

The amount of aromatic sulfonyl azide used may conveniently be e.g. 0.5 to 10% wt, preferably 1 to 8% wt based on the base oil. If desired, higher amounts, e.g. 10% wt to 15% wt, may be used in order to provide a concentrated lubricating oil composition which would be admixed with additional base oil for use as a lubricant.

For use as lubricants, lubricating oil compositions in accordance with the invention may additionally contain anticorrosion additives, and/or antioxidants and/or a detergent and/or an extreme-pressure additive and/or one or more VI improvers and/or pour-point depressants, as will readily appreciated by those skilled in the art.

The ranges and limitations provided in the instant specification and claims are those which are believed to particularly point out and distinctly claim the instant invention. It is, however, understood that other ranges and limitations that perform substantially the same function in substantially the same way to obtain substantially the same result are intended to be within the scope of the instant invention as defined by the instant specification and claims.

EXAMPLES

The invention will be described by the following example(s) which are provided for illustrative purposes and are not to be construed as limiting the invention:

Two base oils of mineral origin were used, via. "XHVI 8.2" ("XHVI" is a trade mark) and "HVI 130 H". "XHVI 8.2" is a bright and clear high viscosity index base oil having viscosity at 100° C. 7.8 to 8.5 mm$^2$/s (ASTM D445), viscosity index 140 (ASTM D2270) and minimum flash point 210° (ASTM D 93). "HVI 130 H" is a hydroprocessed, bright and clear, high viscosity index base oil having viscosity at 100° C. 9.0 to 10.0 mm$^2$/S, viscosity index 95 and minimum flash point 225° C. (ASTM D 92).

EXAMPLES 1 AND 2

Reaction of 3-azidosulfonylbenzoic acid with base oils:

"XHVI 8.2" Base oil was heated to 200° C. under nitrogen. A slurry of 3-azidosulfonylbenzoic acid (ASB) in an aliquot of "XHVI 8.2" base oil was added to the heated base oil, with stirring, over 60 minutes, after which it was allowed to cool to ambient temperature (20° C.) and filtered. Mass spectrometry and infrared analysis revealed no residual ASB in the filtrate and led to the conclusion that ASB had reacted with molecules of the base oil to yield N-alkylated carboxybenzenesulfonyl amides.

A corresponding procedure (Example 2) was followed using "HVI 130 H" base oil, in place of the "XHVI 8.2" base oil, with corresponding results.

EXAMPLES 3 AND 4

Reaction of ASB-functionalized base oils with 3-dimethylamino-1-propylamine:

The product of Example 1 (1001 g), 3-dimethylamino-1-propylamine (DAP) (55.3 g), triethylamine (54.8 g), boron trifluoride etherate ((C$_2$H$_5$)$_2$O.BF$_3$) (76.6 g) and toluene (500 ml) were stirred together and heated at 110° C. under nitrogen, with stirring, for 70 hours, at which stage infrared analysis indicated complete conversion of the product of Example 1. Excess other reagents were distilled off in vacuo at 90° C.

A corresponding procedure (Example 4) was followed using the product of Example 2, with corresponding results.

EXAMPLE 5

Reaction of ASB-functionalized base oil with 3-dimethylamino-1-propylamine:

The process of Example 3 was repeated but without the triethylamine and the toluene. Infrared analysis indicated complete conversion after heating at 110° C. for 21 hours.

EXAMPLE 6

Reaction of ASB-functionalized base oil with dodecanol:

The product of Example 1 (939.6 g) 1-dodecanol (31.5 g), p-toluenesulfonic acid (19.6 g) and toluene (335.2 g) were heated at 110° C. for 3 hours in a Dean-Stark apparatus, with azeotropic removal of water. The mixture was then allowed to cool to ambient temperature (20°), filtered to remove insolubles and the filtrate was extracted with aqueous sodium hydroxide (0.1M, 400 ml). The organic layer was then separated off, dried (MgSO$_4$), filtered, and functionalized base oil was isolated by removal of volatiles in vacuo at 110° C.

EXAMPLES 7 AND 8

Reaction of ASB-functionalized base oils with dodecanol:

The product of Example 2 (939.6 g), 1-dodecanol (31.5 g), p-toluenesulfonic acid (3.2 g) and toluene (335.2 g) were heated at 110° C. for 3 hours in a Dean-Stark apparatus, with azeotropic removal of water. The mixture was then allowed to cool to ambient temperature (20° C.) and was stirred together with an excess (2-fold based on total initial acids) of calcium hydroxide for 1 hour. The resulting slurry was filtered and the desired functionalized base oil was isolated by removal of volatiles in vacuo at 110° C.

A corresponding procedure (Example 8) was followed using the product of Example 1, giving a product entirely equivalent to that of Example 6.

EXAMPLES 9 TO 12

Conversion of ASB-functionalized bas oils via acid chlorides:

The products of Examples 1 and 2 were converted to corresponding acid chlorides by reaction of 100 g samples with excess thionyl chloride in the presence of pyridine (5% mol, based on initial ASB) under nitrogen at 75° C.

The resulting acid chlorides derived from the products of Examples 1 and 2 were reacted with 3-dimethylamino-1-propylamine under nitrogen at 75° C. for 7 hours to give products (Examples 9 and 10) corresponding to those of Examples 3 and 4.

The resulting acid chlorides were also reacted with 1-dodecanol under nitrogen at 75° C. for 7 hours to give products (Examples 11 and 12) corresponding to those of Examples 6 and 7.

EXAMPLES 13 TO 17

Reaction of 3-azidosulfonylbenzoic acid with base oil, at varying concentrations:

"XHVI 8.2" base oil was reacted with various concentrations of ASB under conditions corresponding to those of Example 1. Details of quantities of ASB and of results of analyses of products are given in Table I following.

TABLE I

| Example | ASB Intake % w/w | ASB Intake mmol/g | TAN (mmol/g) | S (mmol/g) | N (mmol/g) | Efficiency (%, calculated from S analyses) |
|---------|------|-------|-----|-----|-----|-----|
| 1  | 4.1 | 181 | 96  | 80  |     | 44 |
| 13 | 1.0 | 44  | 25  | 25  | 22  | 57 |
| 14* | 4.1 | 181 | 82  | 77  | 64  | 43 |
| 15 | 4.0 | 176 | 105 | 96  | 74  | 55 |
| 16 | 7.7 | 339 | 212 | 192 | 126 | 56 |
| 17 | 7.8 | 343 | 201 |     |     |    |

*reaction in the presence of "IONOX 330" (trademark) antioxidant (1% w/w) (viz. 1,3,5-trimethyl-2,4,6-tris(3,5-di-tert-butyl-4-hydroxybenzyl)benzene

EXAMPLE 18

Various of the modified base oils of the above Examples were subjected to the following tests:

1. Carbon Black Dispersancy Test (CBDT) (British Rail publication BR 669:1984):

3% of carbon black is added to the oil and increase in kinematic viscosity at 60° C. is determined, using an Ubbelohde viscometer. A low result indicates good performance.

2. Differential Scanning Calorimetry Test—onset temperature (DSC onset):

The temperature (°C.) at which oxidation begins when a small sample (2 mg) is heated at controlled rate of temperature increase (20° C./minute) in an oxygen atmosphere (ambient pressure) is measured. A high result indicates good performance.

3. Differential Scanning Calorimetry Test—inhibited (DSC inhibited):

The time elapsing (minutes) before onset of oxidation at 180° C., in an oxygen atmosphere ($3.5 \times 10^6$ Pa), of a sample (2 mg) containing 0.5% w of a phenolic antioxidant is measured. A high result indicates good performance.

4. Shaken, Circulatory Oxidation Test (SCOT):

The time (minutes) is measured for a sample (5 g) containing a soluble copper catalyst to absorb a fixed amount (25 ml) of oxygen at 160° C. A high result indicates a good performance.

5. Oxidation Induction Period Test (IP 280):

The time hours is measured for volatile acidity of a sample containing a soluble copper catalyst to reach 1 mg KOH/g equivalent when oxygen is passed through the sample at 120° C. (Institute of Petroleum Test IP 280). A high result indicates good performance.

6. Insolubles following Oxidation Induction Period Test (IP 280 insols):

Amounts of material (mg) which are insoluble in heptane at the end of test 5 are measured according to test IP 280. A low result indicates good performance.

7. Wolf Strip Test:

The weight (mg) of deposit formed on a standard steel strip (18 cm × 4.5 cm) by sample flowing over the strip heated to 250° C. in air for 12 hours at a rate of 50 ml/minute is measured. A low result indicates good performance.

Results of the above tests are given in Table II following.

TABLE II

| Test | Comparative "XHVI 8.2" oil | Comparative "HVI 130H" oil | Product of Example 1 | 2 | 3 | 4 | 6 | 7 |
|------|------|------|------|------|------|------|------|------|
| 1. CBDT         | 156 | 96   | 14  | 23   | 16  | 86   | 45 | 22 |
| 2. DSC onset    | 204 | 207  | 200 | 229  | 214 | 222  | 200 | 211 |
| 3. DSC inhibited| 20  | 23   | 20  | >90  | 25  | 57   | 12 | 13 |
| 4. SCOT         | 4   | 4    | 35  | 60   | >95 | >130 | 3  | 3  |
| 5. IP 280       | <10 | <10  | <10 | >500 | 230 | 500  | 5  | 30 |
| 6. IP 280 Insols| —   | 1253 | —   | 674  | 10  | 5    | 15 | 1183 |
| 7. Wolf Strip   | 400 | 240  | —   | —    | 20  | 240  | 85 | 25 |

In Table II it will be noted that the products of the Examples exhibit considerably improved dispersancy relative to the base oils, and that for Examples 1 to 4 oxidation stability is greater than for the respective base oils.

What is claimed is:

1. A lubricating oil composition comprising a mineral oil functionalized by the presence of aromatic groups attached to molecules of the mineral oil by a sulfonamido linkage wherein the aromatic groups and sulfonamide linkages attached thereto together have the structure RSO$_2$NH— wherein R represents a phenyl group bearing a substituent —COX, wherein X is a moiety selected from the group consisting of —OH, alkali metal, alkaline earth metal and ammonium radicals, groups —OR$^1$, where R$^1$ is selected from the group consisting of alkyl and polyalkylene glycol-derived moieties, and groups —NHR$^2$, wherein R$^2$ is an alkyl group or an alkylene polyamine group; and mixtures thereof.

2. The composition according to claim 1 wherein R$^1$ is a C$_{6-18}$ alkyl group, and the groups —NHR$^2$ are derived from C$_{1-18}$ amines containing 1 to 8 nitrogen atoms.

3. The composition according to claim 1 wherein R represents a phenyl group bearing a substituent —CONHR$^2$, wherein the group —NHR$^2$ is derived from 3-dimethylamino-1-propylamine.

4. A composition comprising a lubricating oil as defined in claim 1 in admixture with a mineral or synthetic base oil not having sulfonamido linkages.

5. The composition of claim 4 wherein the lubricating oil having sulfonamido linkages comprises a major portion of the composition.

6. The composition of claim 5 wherein the lubricating oil having sulfonamido linkages comprises a minor portion of the composition.

7. A process for preparing a composition according to claim 1 which comprises (1) heating a mineral oil with an aromatic sulfonyl azide of formula $R'-SO_2-N_3$ wherein $R'$ is a phenyl group bearing a substituent —COOH, at a temperature in the range of 100° C. to 300° C,; optionally followed by neutralizing the resulting composition with an alkali metal, or alkaline earth metal, ammonia or an amine; or by further reacting the resulting composition, optionally after conversion of —COOH groups to —COCl groups, with an alcohol of formula $HOR^1$, where $R^1$ is selected from the group consisting of alkyl and polyalkylene glycol-derived moieties, or with an amine $NH_2R^2$, where $R^2$ is alkyl or alkylene polyamine.

8. The process according to claim 7 which comprises heating the mineral oil with an aromatic sulfonyl azide of formula $R^1-SO_2-N_3$ wherein $R^1$ is a phenyl group bearing a substituent —COOH, at a temperature in the range 100° to 300° C., followed by neutralizing the resulting composition with an alkali metal or alkaline earth metal base, ammonia or an amine.

9. The process according to claim 7 which comprises heating the mineral oil with an aromatic sulfonyl azide of formula $R'-SO_2-N_3$ wherein $R'$ is a phenyl group bearing a substituent —COOH, at a temperature in the range of 100° to 300° C., conversion of —COOH groups to —COCl groups, with an alcohol of formula $HOR^1$, where $R^1$ is selected from the group consisting of alkyl and polyalkylene glycol-derived moieties, or with an amine $NH_2R^2$, where $R^2$ is alkyl or alkylene polyamine.

10. The process according to claim 9 wherein the amine $NH_2R^2$ is a $C_{1-18}$ amine containing 1 to 8 nitrogen atoms.

11. The process according to claim 10 wherein the amine $NH_2R^2$ is 3-dimethylamino-1-propylamine.

12. A process for preparing a composition according to claim 1 which comprises reacting the mineral oil with an aromatic sulfonyl azide of formula $R'-SO_2-N_3$ wherein $R'$ is a phenyl group bearing a substituent —COOH, at a temperature in the range of 150° to 150° C., further reacting the resulting composition, optionally after conversion of —COOH groups to —COCl groups, with an alcohol of formula $HOR^1$, where $R^1$ is selected from the group consisting of alkyl and polyalkylene glycol-derived moieties, or with an amine $NH_2R^2$, wherein the amine $NH_2R^2$ is 3-dimethylamino-1-propylamine.

13. A lubricating oil composition comprising a mineral oil functionalized by the presence of aromatic groups attached to molecules of the mineral oil by a sulfonamido linkage wherein the aromatic groups and associated sulfonamido linkages together have the structure $RSO_2NH-$ wherein R represents a phenyl group bearing a substituent —COX, wherein X is a moiety selected from the group consisting of —OH, an alkali metal, alkaline earth metal and ammonium radicals, groups —$OR^1$, where $R^1$ is a $C_{6-18}$ alkyl group, and groups —$NHR^2$ and wherein the groups —$NHR^2$ are derived from $C_{1-18}$ amines containing 1 to 8 nitrogen atoms; and mixtures thereof.

* * * * *